United States Patent
Wolf

(10) Patent No.: US 9,481,348 B2
(45) Date of Patent: Nov. 1, 2016

(54) SYSTEM AND METHOD FOR ADDRESSING A PNEUMATIC EMERGENCY IN A HELPER LOCOMOTIVE

(71) Applicant: Wabtec Holding Corp., Wilmerding, PA (US)

(72) Inventor: Charles L. Wolf, Olney, MD (US)

(73) Assignee: Wabtec Holding Corp., Wilmerding, PA (US)

( * ) Notice: Subject to any disclaimer, the term of this patent is extended or adjusted under 35 U.S.C. 154(b) by 78 days.

(21) Appl. No.: 13/623,274

(22) Filed: Sep. 20, 2012

(65) Prior Publication Data

US 2014/0081487 A1    Mar. 20, 2014

(51) Int. Cl.
*B61H 13/00* (2006.01)
*B60T 8/17* (2006.01)
*B60T 8/88* (2006.01)
*B60T 13/66* (2006.01)
*B60T 17/22* (2006.01)

(52) U.S. Cl.
CPC .............. *B60T 8/885* (2013.01); *B60T 13/665* (2013.01); *B60T 17/228* (2013.01); *B60T 2270/402* (2013.01)

(58) Field of Classification Search
None
See application file for complete search history.

(56) References Cited

U.S. PATENT DOCUMENTS

| | | | | |
|---|---|---|---|---|
| 3,180,695 A | * | 4/1965 | McClure | B60T 15/184 303/66 |
| 3,217,662 A | * | 11/1965 | Donald | B60L 15/32 105/1.4 |
| 3,217,663 A | * | 11/1965 | Donald | B60L 15/38 105/1.4 |
| 3,232,677 A | * | 2/1966 | Wilson | B60T 15/184 303/66 |
| 3,374,035 A | * | 3/1968 | Howard | B60T 15/16 303/16 |
| 4,487,060 A | | 12/1984 | Pomeroy | |
| 4,638,298 A | * | 1/1987 | Spiro | H04B 3/542 340/12.32 |
| 4,654,629 A | | 3/1987 | Bezos et al. | |
| 4,723,737 A | * | 2/1988 | Mimoun | G08G 1/163 246/167 R |
| 4,785,197 A | | 11/1988 | Bezos et al. | |
| 4,799,052 A | * | 1/1989 | Near | H04L 12/417 370/451 |

(Continued)

FOREIGN PATENT DOCUMENTS

CA    2088532 A1    6/1994

OTHER PUBLICATIONS

Electronically Controlled Pneumatic (ECP) Cable-Based Brake Systems—Performance Requirements; AAR Manual of Standards and Recommended Practices (continued below).

(Continued)

*Primary Examiner* — Jean-Paul Cass
(74) *Attorney, Agent, or Firm* — The Webb Law Firm

(57) ABSTRACT

Methods and systems for control and use in connection with an electronically controlled pneumatic (ECP)-equipped train after transmission of a brake pipe emergency dump command message by a helper locomotive associated with the train. These methods and systems are implemented in an effort to improve braking safety and reduce brake system recovery time of a train.

21 Claims, 2 Drawing Sheets

(56) References Cited

U.S. PATENT DOCUMENTS

| | | | |
|---|---|---|---|
| 4,885,689 A | 12/1989 | Kane et al. | |
| 4,947,484 A * | 8/1990 | Twitty | G08C 15/00 714/748 |
| 5,010,332 A * | 4/1991 | Egami | H04L 12/437 370/462 |
| 5,016,840 A | 5/1991 | Bezos | |
| 5,039,038 A * | 8/1991 | Nichols | B60L 15/32 246/167 R |
| 5,077,554 A * | 12/1991 | Orita | G08B 25/003 340/2.81 |
| 5,176,350 A * | 1/1993 | McQuistian | G12B 5/00 248/231.51 |
| 5,190,359 A | 3/1993 | Egerton | |
| 5,235,849 A | 8/1993 | Egerton | |
| 5,265,832 A * | 11/1993 | Wesling | B61L 15/0036 246/169 R |
| 5,267,473 A | 12/1993 | Bezos et al. | |
| 5,311,512 A * | 5/1994 | Bartis | G06F 13/128 370/439 |
| 5,347,515 A * | 9/1994 | Marino | H04L 12/10 340/9.1 |
| 5,351,919 A * | 10/1994 | Martin | B61L 15/0018 213/1.3 |
| 5,374,015 A | 12/1994 | Bezos et al. | |
| 5,376,925 A | 12/1994 | Crisafulli et al. | |
| 5,377,938 A * | 1/1995 | Bezos | B61L 15/0054 246/167 R |
| 5,383,717 A * | 1/1995 | Fernandez | B60L 15/32 246/167 R |
| 5,408,679 A * | 4/1995 | Masuda | H04B 7/2606 455/11.1 |
| 5,420,883 A * | 5/1995 | Swensen | B61L 3/125 342/450 |
| 5,428,603 A * | 6/1995 | Kivett | B61L 3/125 370/280 |
| 5,434,984 A * | 7/1995 | Deloddere | G06F 13/37 370/462 |
| 5,435,505 A * | 7/1995 | Martin | B61L 15/0018 213/1.3 |
| 5,448,563 A * | 9/1995 | Taniguchi | H04L 12/417 340/2.7 |
| 5,465,081 A * | 11/1995 | Todd | G08B 25/10 340/10.2 |
| 5,481,532 A * | 1/1996 | Hassan | H04L 1/1877 340/7.22 |
| 5,481,539 A * | 1/1996 | Hershey | H04B 7/2606 370/312 |
| 5,570,284 A * | 10/1996 | Roselli | B60L 3/12 246/187 C |
| 5,592,483 A * | 1/1997 | Hieda | H04L 12/413 370/349 |
| 5,623,413 A * | 4/1997 | Matheson | B61L 27/0016 104/307 |
| 5,651,517 A * | 7/1997 | Stevens | B61L 15/0036 246/122 R |
| 5,681,015 A * | 10/1997 | Kull | B60T 13/665 246/167 R |
| 5,720,455 A * | 2/1998 | Kull | B60L 15/32 246/187 C |
| 5,835,005 A * | 11/1998 | Furukawa | H04B 3/58 340/12.32 |
| 5,873,638 A | 2/1999 | Bezos | |
| 5,896,565 A * | 4/1999 | Miller | H04M 3/56 340/539.1 |
| 5,986,579 A * | 11/1999 | Halvorson | B61L 15/0036 104/88.03 |
| 6,095,618 A * | 8/2000 | Heneka | B60L 15/32 246/167 R |
| 6,114,974 A * | 9/2000 | Halvorson | B61L 15/0036 104/88.03 |
| 6,195,600 B1 * | 2/2001 | Kettle, Jr. | B60L 3/00 246/167 R |
| 6,334,654 B1 * | 1/2002 | Root | B60T 13/662 303/15 |
| 6,347,840 B1 * | 2/2002 | Marra | B60T 17/228 303/15 |
| 6,361,124 B1 * | 3/2002 | Marra | B60T 13/662 303/15 |
| 6,398,321 B1 * | 6/2002 | Atkins | B60T 8/172 303/158 |
| 6,400,281 B1 * | 6/2002 | Darby, Jr. | B61L 3/125 246/167 R |
| 6,867,708 B2 * | 3/2005 | Darby, Jr. | B61L 3/125 246/167 R |
| 6,932,437 B1 * | 8/2005 | Root | B60T 13/662 303/15 |
| 7,149,962 B1 * | 12/2006 | Davis | G06Q 10/08 715/210 |
| 7,310,688 B1 * | 12/2007 | Chin | H04L 45/00 370/351 |
| 7,397,771 B2 * | 7/2008 | Nakasaku | H04L 45/54 370/254 |
| 7,484,169 B2 * | 1/2009 | Hrebek | B61L 3/127 714/807 |
| 7,707,474 B2 * | 4/2010 | Rinne | H04W 52/12 343/814 |
| 7,770,847 B1 * | 8/2010 | Severson | A63H 19/24 246/1 C |
| 8,115,493 B2 * | 2/2012 | Gallagher | B61L 15/0036 246/182 A |
| 8,155,809 B1 * | 4/2012 | Bilodeau | B61L 23/042 246/120 |
| 8,245,983 B2 * | 8/2012 | Gilbertson | B61L 1/20 246/167 R |
| 8,696,071 B2 * | 4/2014 | Root | B60T 13/662 303/47 |
| 8,743,873 B2 * | 6/2014 | Shigeeda | B61L 15/0036 370/389 |
| 2002/0027495 A1 * | 3/2002 | Darby, Jr. | B61L 3/125 340/298 |
| 2008/0122287 A1 * | 5/2008 | Wei | B60T 8/365 303/116.1 |
| 2008/0149781 A1 * | 6/2008 | Root | B60T 17/228 246/167 R |
| 2010/0085058 A1 * | 4/2010 | Gallagher | B61L 15/0036 324/503 |
| 2010/0130124 A1 * | 5/2010 | Teeter | B61L 15/0027 455/15 |
| 2012/0316700 A1 * | 12/2012 | Mudiam | H04L 67/12 701/1 |
| 2014/0081487 A1 * | 3/2014 | Wolf | B60T 8/885 701/19 |

OTHER PUBLICATIONS

Electronically Controlled Brake Systems; Standard S.4200; Adopted 1999; revised 2002, 2004, 2008.

* cited by examiner

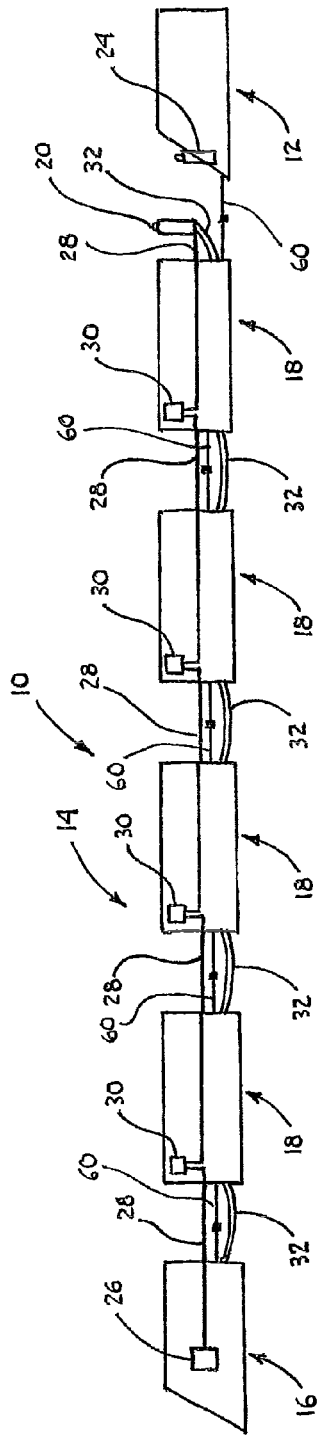
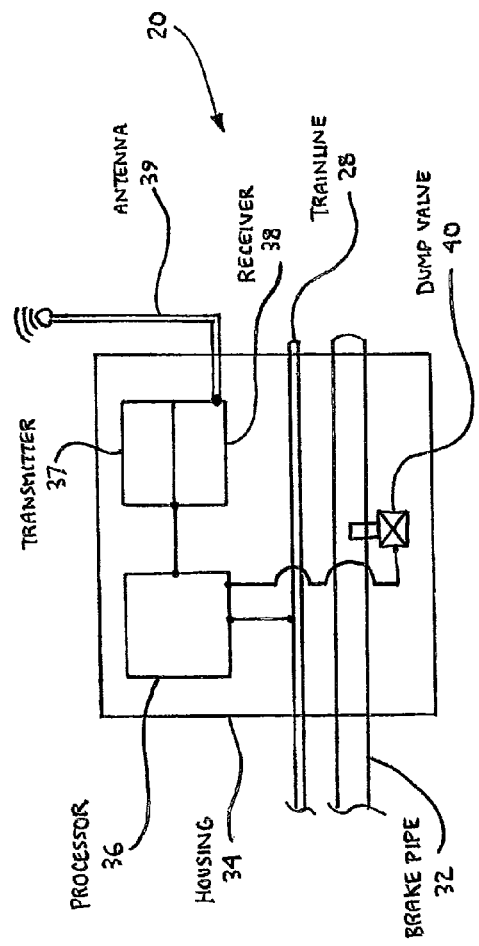

SYSTEM AND METHOD FOR ADDRESSING A PNEUMATIC EMERGENCY IN A HELPER LOCOMOTIVE

BACKGROUND OF THE INVENTION

1. Field of the Invention

The present invention relates to a system and method for addressing a pneumatic emergency initiated in a helper locomotive and, more particularly, to a system and method of improving braking safety and reducing brake system recovery time in an electronically controlled pneumatic (ECP)-equipped train after transmission of a brake pipe emergency dump command message by the helper locomotive associated with the train.

2. Description of Related Art

The air brake system on a train includes a brake pipe which extends the length of the train. The pressure is maintained in the brake pipe by the lead locomotive except when the engineer in the lead locomotive applies the brakes by releasing air pressure. The drop in air pressure propagates down the brake pipe causing brakes to be applied by the locomotives and all the cars in the train. With the advent of two-way end-of-train (EOT) units, an emergency braking event can be initiated by the engineer by causing air pressure to be vented simultaneously at the front and back of the train. The EOT unit is mounted on a coupler of the last car of the train, and specific coupler mounts have been designed to allow a helper locomotive to couple to the last train without damaging the EOT unit.

A helper locomotive may provide additional braking or motive power to the train. For example, in a train a mile long, a consist having three locomotives may provide sufficient power for a run along average grade terrain. However, a run over an above-average grade may require additional power in the form of a helper locomotive being attached to the end of the train just before traversing the increased grade. Once the train has cleared the increased grade, the helper locomotive is disconnected and may return to its point of origin. Current brake pipes of helper locomotives are connected to the train in one of two manners: a direct physical connection or a virtual connection. With a physical connection, the brake pipe hose of a helper locomotive has a connection to the train. This makes the brakes of the helper locomotive respond like any other car in the train, thus giving control of the brakes to the engineer in the lead locomotive. Coupling and uncoupling of the brake hose of the helper locomotive to the train is accomplished manually. Both operations expose railroad personnel to risk of serious injury. With a virtual connection, the brake pipe hose of the helper locomotive is connected to special radio-based helper equipment and the brake pipe pressure is communicated between the train and the helper locomotive via the existing radio system. Therefore, a safer alternative in adding braking functionality to the helper locomotive that uses a virtual connection is found in electronically controlled pneumatic (ECP) trains.

An ECP-equipped train relies on electronic signals, rather than changes in brake pipe air pressure, to activate brake valves on individual freight cars. Because signal propagation from the first to last car is instantaneous, the rate of brake cylinder pressure buildup can be increased. With conventional pneumatic brakes, brake cylinder pressure buildup time is carefully retarded to prevent the last cars in a train, where the brakes have not yet applied, from running into the first cars with fully developed brake cylinder pressure. With ECP, cylinder pressure buildup is about 6 to 7 psi/second for both emergency and service brake applications. The brakes can be applied, partially released, and then reapplied as often as necessary, within the ability of the locomotive compressors to replenish reservoirs on the cars of a long train.

In the context of a helper locomotive with a virtual brake pipe connection, ECP-equipped trains do not require that a physical brake pipe connection be made between the train and the helper locomotive. Specifically, a system is provided for forming a virtual brake pipe connection between the head-end-unit (HEU) of the helper locomotive and the EOT unit of the train. Thus, the EOT unit reads ECP braking commands from the ECP trainline and translates them into radio messages, which are sent to the helper locomotive. The system then sets the braking on the helper locomotive to match that of the ECP braking application on the train. A commercial system that implements the aforementioned functionality is known as HelperLink™ by Wabtec Railway Electronics.

As is known in the art, the aforementioned system may also initiate braking in the context of issuing an emergency brake application to the associated train based on a pneumatic emergency experienced on the helper locomotive or if the engineer of the helper locomotive is aware of a situation affecting the train that would require an emergency brake application. In such an instance, the emergency brake application involves the transmission of a brake pipe emergency dump command from the helper locomotive to the EOT unit. Upon receipt of the brake pipe emergency dump command, the EOT unit would open the brake pipe dump valve, which results in immediate discharge of the brake pipe of the train, and an immediate application of the brakes on all cars to an emergency level. This sudden and non-graduated removal of air from the brake pipe increases in-train forces and results in depletion of all air, which requires a lengthy recharging and testing of the entire brake system before the train may continue its travel.

Thus, there is a need for a system and method that overcomes or addresses some or all of the limitations of the existing ECP train systems and arrangements.

SUMMARY OF THE INVENTION

Generally, the present invention provides a system and method for addressing a pneumatic emergency in a helper train that address some or all of the deficiencies and drawbacks associated with existing electronically controlled pneumatic (ECP)-equipped trains and components.

Accordingly, in one preferred and non-limiting embodiment, provided is a method for improving braking safety and reducing brake system recovery time in an electronically controlled pneumatic (ECP)-equipped train after transmission of a brake pipe emergency dump command message by a helper locomotive associated with the train having multiple cars. This method includes: (a) receiving the brake pipe emergency dump command message at an end-of-train (EOT) unit associated with the train; (b) transmitting an ECP emergency brake request message from the EOT unit to at least one car in the train and a head-end-unit (HEU) of the train; (c) waiting a predetermined period of time after transmitting the ECP emergency brake request message, for receipt of an ECP head-of-train (HOT) brake command message transmitted by the HEU (e.g., indicating that the ECP emergency brake command has been received by the HEU); and (d) opening a brake pipe dump valve if the ECP HOT brake command message has not been issued to the at least one car in the train within the predetermined period of time. The ECP emergency brake request message is a message that requests that the train be stopped and/or a message that identifies that the helper locomotive has gone into a pneumatic emergency.

The brake pipe dump valve may be in fluid communication with a brake pipe of the train. The helper locomotive may be a pusher locomotive coupled to an end of the train without a physical connection to the brake pipe of the train. The predetermined period of time may be from about 1 to about 10 seconds, and preferably from about 3 to about 5 seconds. The ECP HOT brake command message may be: an emergency train brake command (TBC), or as is known in the art, a TBC=120% command; or some lesser or reduced brake command. Receipt of the brake pipe emergency dump command message may occur on an EOT radio network, and the EOT transmission of the ECP emergency brake request to the cars and to the ECP HEU, and receipt of the ECP HOT brake command message may occur on an ECP messaging network.

In a further preferred and non-limiting embodiment, provided is directed to an EOT unit for use in improving braking safety and reducing brake system recovery time in an ECP-equipped train after transmission of a brake pipe emergency dump command message by a helper locomotive associated with the train. This unit includes: a brake pipe dump valve; an EOT radio receiver for receiving the brake pipe emergency dump command message; an ECP transmitter for transmitting an ECP emergency brake request message; an ECP trainline receiver for receiving an ECP HOT brake command message; and a processor for determining if the ECP HOT brake command message has been received within a predetermined period of time after transmitting the ECP emergency brake request message, where, if a determination is made that the ECP HOT brake command message has not been received within the predetermined period of time, causing the brake pipe dump valve to be opened.

In a further preferred and non-limiting embodiment, provided is a system for improving braking safety and reducing brake system recovery time in an ECP-equipped train after transmission of a brake pipe emergency dump command message by a helper locomotive associated with the train. The system includes: an EOT radio network; a helper locomotive equipped with a virtual brake pipe connection, wherein the helper locomotive is configured to transmit the brake pipe emergency dump command message on the EOT radio network; an EOT unit situated on the train, wherein the EOT unit is configured to receive the brake pipe emergency dump command message from the EOT radio network, and in response thereto, transmit an ECP emergency braking request message on an ECP messaging network, wherein the EOT unit includes a brake pipe dump valve, and wherein at least one car in the train is configured to respond to an ECP emergency braking request message from the ECP messaging network from the EOT; and an HEU situated on the train, wherein the HEU of the train is configured to transmit an ECP HOT brake command message on the ECP messaging network, and wherein the EOT unit is further configured to open the brake pipe dump valve if the ECP HOT brake command message has not been received within a predetermined period of time after transmitting the ECP emergency brake request message.

By utilizing an ECP EOT emergency brake command request to activate the brakes on the cars corresponding to an emergency braking command (e.g., TBC=120% command) or corresponding to a lesser or reduced TBC brake command, as opposed to a traditional EOT brake pipe emergency dump command at the EOT unit, the benefits associated with an ECP-equipped train are realized. Specifically, the cars responding directly to the EOT without waiting for a command from the ECP HOT command yields a shorter stopping distance; a reduction of in-train forces; reduced wheel, brake shoe, and draft gear wear; and a reduction in the amount of brake system air utilized to recover from the brake application, thereby minimizing down-time.

With existing systems, a pneumatic emergency on the helper locomotive would result in the EOT activating its dump valve, and the brake pipe of the train being exhausted. All of the cars in the train would apply their brakes to an emergency level, but not at the same time. The cars nearest the EOT would apply their brakes the quickest. Eventually a few cars would broadcast that they were in a pneumatic emergency state, and the rest of the cars would apply their brakes to an emergency level. During the time when the brake pipe was exhausted, the reservoir levels on the car would remain constant at the equalization level, and would not rise. Any nominal pneumatic leaks on the cars, as is common to some level, would cause the reservoir levels to slowly drain down.

Recovery from the pneumatic emergency requires that the brake pipe be fully charged, and that all of the reservoirs on the cars be replenished. Depending on the length of the train, this recovery may take more than 15 minutes. By implementing the system and method of the present invention, the ECP EOT would hold-off activating the dump valve in lieu of transmitting an ECP EOT emergency brake request message over the ECP network that causes all of the cars to immediately activate their brakes. The activation of the brakes on the car will occur faster than with existing systems, resulting in a shorter stopping distance. Assuming the ECP HEU received the ECP EOT emergency brake request message and responded with an ECP EOT brake command message, the ECP EOT will refrain from activating the EOT dump valve and the brake pipe will remain charged. Since the brake pipe remains charged, all of the reservoirs on the cars in the train will pull air from the brake pipe and fully charge their reservoirs. Any nominal pneumatic leaks on the cars, as is common to some level, will be replenished with air from the brake pipe. Recovery from the helper emergency can occur as soon as the ECP logic allows it, without having to wait for either the brake pipe or the reservoirs on the cars in the train, to recharge. Accordingly, the present invention provides certain benefits and improvements for addressing pneumatic emergencies in helper locomotives.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 1 is a schematic of one embodiment of a system for addressing a pneumatic emergency initiated by a helper locomotive associated with a train, in accordance with the principles of the present invention;

FIG. 2 is a schematic of one embodiment of an EOT unit, in accordance with the present invention.

DETAILED DESCRIPTION OF THE INVENTION

Figure 3:
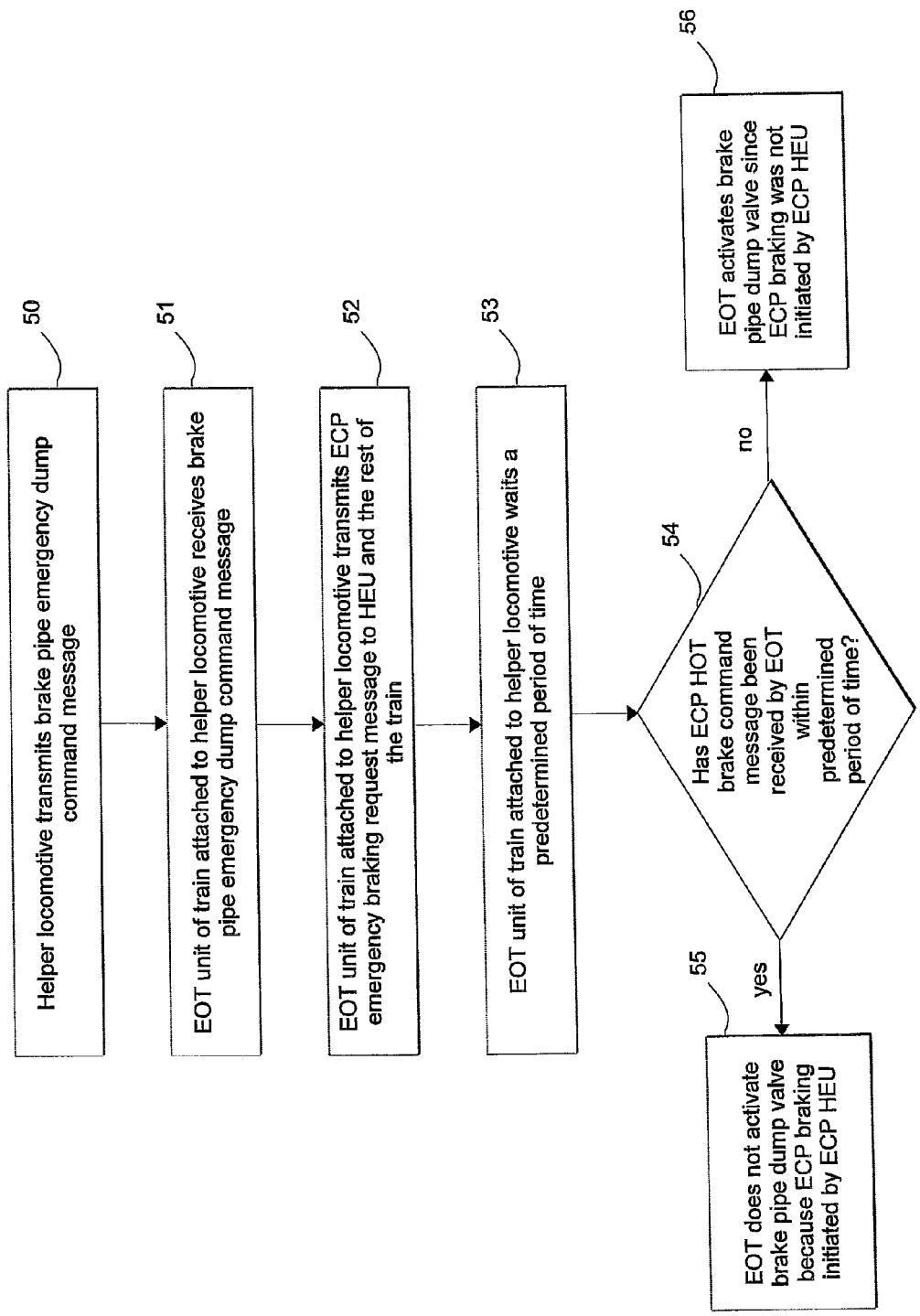
FIG. 3 is a flowchart outlining the one preferred operational sequence, in accordance with the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further any of the steps, functions, or determinations can be made by any suitable computing arrangement or processor, whether a standalone computer or a programming interface, module, software, firmware, or other code integrated with or implemented on an existing computing device or processor of any of the units discussed hereinafter.

FIG. 1 depicts a schematic of one preferred and non-limiting embodiment of a system 10 for addressing a pneumatic emergency initiated by a helper locomotive 12 associated with a train 14. The train 14 includes a locomotive 16 and one or more cars 18 sequentially coupled thereto. The last car 18 includes an end-of-train (EOT) unit 20 and the locomotive 16 includes an electronically controlled pneumatic (ECP) head-end-unit (HEU) 26, all communicatively connected via an electronically controlled pneumatic (ECP) messaging network (whether in hard-wired or wireless form). The HOT locomotive 16 is mechanically coupled (via mechanical coupler 60) to the first car 18, adjacent cars 18 are mechanically coupled together, and the helper locomotive 12 is mechanically coupled to the last car 18 (and has a physical separation of the brake pipe). The helper locomotive 12 preferably includes radio-based helper equipment 24 that communicates over an EOT radio network (preferably in wireless form) to the EOT unit 20 mounted on the last car 18. It is to be understood that functionality incorporated in the head-of-train HEU 26 may be facilitating or encompassed by respective separate components connected to and/or configured to interface with the HEU 26.

The train 14 includes an ECP trainline 28 communicatively connecting an ECP controller 30 of each car 18 to the ECP messaging network and, thereby, the HEU controller 26. The train 14 also includes a brake pipe 32 running the length of the train 14, which connects each car 18 with an adjacent car 18, and is terminated with the EOT unit 20 at the last car 18. The helper locomotive 12 may be a pusher locomotive coupled to an end of the train 14 without a physical connection to the brake pipe 32 of the train 14.

The radio-based helper equipment 24 of the helper locomotive 12 is configured to transmit a brake pipe emergency dump request message on the ECP messaging network. It is noted that ECP messages preferably occur only on the wired ECP network, while messages from the helper locomotive 12 occur over the radio-based EOT network. The HEU 26 of the HOT locomotive 16 is configured to receive an ECP emergency brake request message (which is a message or includes content that requests that the train 14 be stopped and/or that identifies that the helper locomotive 12 has gone into a pneumatic emergency). The HEU 26 of the HOT locomotive 16 is also configured to, in response to receipt of the ECP emergency brake request message, transmit an ECP HOT brake command message on the ECP messaging network to at least one, and preferably, each ECP controller 30 and the EOT unit 20. One example of an ECP HOT brake command message is a train brake command of 120%, or a TBC=120% command. As is known in the art, a TBC=120% command corresponds to an ECP emergency brake application, as is discussed in publication AAR 54200: ECP (*Cable-Based Brake System Performance Requirements*), the contents of which is incorporated herein by reference in its entirety. However, it is to be understood that other suitable degrees of braking may be associated with the ECP HOT brake command message. It is further to be understood that existing HEU 26 may be programmed to provide the aforementioned functionality.

FIG. 2 is a schematic of one preferred and non-limiting embodiment of the EOT unit 20. According to this embodiment, the EOT unit 20 includes a housing 34 containing a processor 36, a transmitter 37, and a receiver 38, all communicatively connected to an antenna 39. It is to be understood that the EOT unit 20 may include the necessary components (e.g., storage medium, circuitry, interface, software/firmware, and the like) for providing the fundamental functionality of any existing EOT unit. Existing EOT units and associated components are described in one or more of U.S. Pat. Nos. 4,487,060; 4,885,689; 5,016,840; 5,190,359; 5,235,849; 5,267,473; 5,383,717; and 5,873,638, all of which are incorporated herein by reference in their entirety. The EOT unit 20 also includes a brake pipe dump valve 40 in fluid communication with the brake pipe 32 of the train 14. The EOT unit 20 may be connected to the ECP trainline 28, as shown in FIG. 1. As is known in the art, receipt of an appropriate signal at the EOT unit 20 results in appropriate mechanisms opening the brake pipe dump valve 40, resulting in release of the air along the entire brake pipe 32 of the train 14.

The receiver 38 and associated hardware are configured to receive a brake pipe emergency dump command message and to send the information to the processor 36. The processor 36 and associated software are configured to send an ECP HOT brake request message over the ECP trainline 28 to the cars (e.g., the ECP controllers 30 of each car) and to the ECP HEU 26. Further, the processor 36 and associated software operating thereon are configured to determine if the ECP HOT brake request message has been received within a predetermined period of time after transmission of the ECP emergency brake request message.

In one preferred and non-limiting embodiment, the predetermined period of time may be in the range of about 1 second to about 10 seconds, and preferably in the range of about 3 seconds to about 5 seconds. However, it is to be understood that any suitable time in any suitable time measuring unit may be used in connection with the present invention. It is to be further understood that a suitable time would preferably be a time period in which it is likely or determined that an ECP HOT brake command message should have already been transmitted and been received. The predetermined period of time may be pre-programmed in the EOT unit or may be dynamically modified or programmed based on a per-situation basis before or during train operation, based on certain conditions, such as train parameters, operational conditions, environmental conditions, computer logic assessments, etc. The processor 36 and associated software are also configured to open the brake pipe dump valve 40 if a determination is made that the ECP HOT brake command message has not been received within the predetermined period of time.

A method for improving braking safety and reducing brake system recovery time in the ECP-equipped train 14 after transmission of a brake pipe emergency dump command message by the helper locomotive 12 associated with the train 14 will now be discussed in accordance with one preferred and non-limiting embodiment of the present invention. With continued reference to FIGS. 1 and 2, FIG. 3 depicts a flowchart for illustrating the operational steps in implementing one embodiment of the present invention. If the engineer on the helper locomotive 12 is aware of a situation affecting the train 14 that would require an emergency brake application, the engineer initiates a brake pipe emergency dump command. Specifically, the radio-based helper equipment 24 of the helper locomotive 12 transmits the brake pipe emergency dump command message to the EOT unit 20 of the car 18 of the train 14, as shown in step 50. The EOT unit 20 receives the brake pipe emergency dump command message at step 51 and, in response thereto, transmits the ECP emergency brake request message to the HEU 26 of the locomotive 16 of the train 14, as shown in step 52.

Thereafter, as shown in step 53, the EOT unit 20 waits a predetermined period of time after transmitting the ECP emergency brake request message. Appropriate logic in the EOT unit 20, as provided for by the processor 36 and associated software operating thereon, determines whether or not the ECP HOT brake command message (e.g., TBC=120% or some lesser or reduced brake command) has been received at the EOT unit 20 within the predetermined period of time, as shown in step 54. As shown in step 55, if the ECP HOT brake command message was received by the EOT unit 20 within the predetermined period of time, the EOT unit 20 does not open the brake pipe dump valve 40 because the processor 36 has received confirmation that ECP braking (e.g., TBC=120% or some lesser or reduced brake command) has been initiated by the locomotive 16. This results only in a partial depletion of the quantity of air in the car reservoirs needed to apply the brakes, as opposed to depletion of the air in the brake pipe 32. Further, while in an ECP brake application, the car reservoirs will begin to charge back to their full capacity from the charged brake pipe 32.

In contrast, as shown in step 56, if the ECP HOT brake command message was not received by the EOT unit 20 within the predetermined period of time, the EOT unit 20 opens the brake pipe dump valve 40 because it is under the assumption that the locomotive 16 did not receive the ECP emergency braking request message or could not initiate ECP braking. This results in a traditional EOT brake pipe emergency dump command to be executed at the EOT unit 20, causing all air in the brake pipe 32 to be exhausted to atmosphere, and associated car reservoirs to equalize with the brake cylinder. In this case, the car reservoirs will not begin to recharge until the brake pipe is recharged by the operator.

In this manner, the present invention provides a system and method for improving braking safety and reducing brake system recovery time in an ECP-equipped train after transmission of a brake pipe emergency dump command message by a helper locomotive associated with the train.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for control in an electronically controlled pneumatic equipped train after transmission of a brake pipe emergency dump command message by a helper locomotive associated with the train comprising a plurality of cars, the method comprising:

receiving, by an end-of-train unit associated with the train and including a processor, the brake pipe emergency dump command message from the helper locomotive;

transmitting, by the end-of-train unit, an electronically controlled pneumatic emergency brake request message to at least one car and a head-end-unit of the train in response to receiving the brake pipe emergency dump command message from the helper locomotive;

waiting, by the end-of-train unit, a predetermined period of time after transmitting the electronically controlled pneumatic emergency brake request message for receipt of an electronically controlled pneumatic head-of-train brake command message transmitted by the head-end unit;

opening, by the end-of-train unit, a brake pipe dump valve in response to a determination that the electronically controlled pneumatic head-of-train brake command message has not been issued to the at least one car in the train within the predetermined period of time, wherein the end-of-train unit does not open the brake pipe dump valve when the electronically controlled pneumatic head-of-train brake command message has been issued to the at least one car in the train within the predetermined period of time, the waiting, by the end-of-train unit, comprising the end-of-train unit not activating the brake dump valve and instead transmitting the electronically controlled pneumatic end-of-train emergency brake request message that causes the plurality of cars to immediately activate brakes, wherein the causing the plurality of cars to immediately activate brakes results in a shorter stopping distance and a brake pipe of the train does not require a predetermined recharging process to recharge the brake pipe from the brake dump unless the electronically controlled pneumatic head-of-train brake command message is not issued to the at least one car in the train within the predetermined period of time.

2. The method of claim 1, wherein the brake pipe dump valve is in fluid communication with the brake pipe of the train.

3. The method of claim 1, wherein the helper locomotive is a pusher locomotive coupled to an end of the train without a physical connection to the brake pipe of the train.

4. The method of claim 1, wherein the predetermined period of time is in the range of from about 1 second to about 10 seconds.

5. The method of claim 1, wherein the predetermined period of time is in the range of from about 3 seconds to about 5 seconds.

6. The method of claim 1, wherein the electronically controlled pneumatic head-of-train brake command message is at least one of the following: a TBC=120% command, a lesser or reduced brake command, or any combination thereof.

7. The method of claim 1, wherein at least one of the following occur on an electronically controlled pneumatic messaging network: receipt of the brake pipe emergency dump command message, transmission of the electronically controlled pneumatic emergency brake request, receipt of the electronically controlled pneumatic head-of-train brake command message, or any combination thereof.

8. The method of claim 1, wherein the electronically controlled pneumatic head-of-train brake command message indicates that the electronically controlled pneumatic emergency brake request has been received from the head-end unit.

9. An end-of-train unit for use in an electronically controlled pneumatic equipped train after transmission of a brake pipe emergency dump command message by a helper locomotive associated with the train, the end-of-train unit comprising:
a brake pipe dump valve;
an end-of-train radio receiver for receiving the brake pipe emergency dump command message from the helper locomotive;
an electronically controlled pneumatic transmitter for transmitting an electronically controlled pneumatic emergency brake request message in response to receiving the brake pipe emergency dump command message from the helper locomotive;
an electronically controlled pneumatic trainline receiver for receiving an electronically controlled pneumatic head-of-train brake command message; and
a processor for determining if the electronically controlled pneumatic head-of-train brake command message has been received within a predetermined period of time after transmitting the electronically controlled pneumatic emergency brake request message, and in response to a determination that the electronically controlled pneumatic end-of-train brake command message has not been received within the predetermined period of time, causing the brake pipe dump valve to be opened, wherein the processor does not cause the brake pipe dump valve to be opened when a determination is made that the electronically controlled pneumatic brake command message has been received within the predetermined period of time, the determining, by the processor, if the electronically controlled neumatic head-of-train brake command message has been received within the predetermined period of time by the processor comprising the processor not causing the activation of the brake dump valve and instead transmitting the electronically controlled pneumatic end-of-train emergency brake request message that causes the plurality of cars to immediately activate brakes, and wherein the causing the plurality of cars to immediately activate brakes results in a shorter stopping distance and a brake pipe of the train does not require a predetermined recharging process to recharge the brake pipe from the brake dump unless the electronically controlled pneumatic head-of-train brake command message is not issued to the at least one car in the train within the predetermined period of time.

10. The EOT unit of claim 9, wherein the predetermined period of time is in the range of from about 1 second to about 10 seconds.

11. The EOT unit of claim 9, wherein the predetermined period of time is in the range of from about 3 seconds to about 5 seconds.

12. The EOT unit of claim 9, wherein the electronically controlled pneumatic head-of-train brake command message is at least one of the following: a TBC=120% command, a lesser or reduced brake command, or any combination thereof.

13. The EOT unit of claim 9, wherein the end-of-train unit is situated on the train, and wherein the brake pipe dump valve is in fluid communication with the brake pipe of the train.

14. A system for use in connection with an electronically controlled pneumatic equipped train after transmission of a brake pipe emergency dump command message by a helper locomotive associated with the train, the system comprising:
an end-of-train radio network;
a helper locomotive equipped with a virtual brake pipe connection, wherein the helper locomotive is configured to transmit the brake pipe emergency dump command message on the end-of-train radio network;
an end-of-train unit situated on the train, wherein the end-of-train unit is configured to receive the brake pipe emergency dump command message from the end-of-train radio network, and in response thereto, transmit an electronically controlled pneumatic emergency braking request message on an electronically controlled pneumatic messaging network, wherein the end-of-train unit includes a brake pipe dump valve, and wherein at least one car in the train is configured to respond to an electronically controlled pneumatic emergency braking request message from the electronically controlled pneumatic messaging network from the end-of-train; and
a head-end-unit situated on the train, wherein the head-end unit of the train is configured to transmit an electronically controlled pneumatic head-to-train brake command message on the electronically controlled pneumatic messaging network, and wherein the end-of-train unit is further configured to open the brake pipe dump valve in response to a determination that the electronically controlled pneumatic head-of-train brake command message has not been received within a predetermined period of time after transmitting the electronically controlled pneumatic emergency brake request message and to not open the brake pipe dump valve when the electronically controlled pneumatic head-of-train brake command message has been received within the predetermined period of time, the determination of whether the electronically controlled pneumatic head-of-train brake command message has been received within the predetermined period of time by the end-of-train unit comprising the end-of-train unit not opening of the brake dump valve and instead transmitting the electronically controlled pneumatic end-of-train emergency brake request message that causes the plurality of cars to immediately activate brakes and wherein the causing the plurality of cars to immediately activate brakes results in a shorter stopping distance and the brake pipe does not require a predetermined recharging process to recharge the brake pipe from the brake dump unless the electronically controlled pneumatic head-of-train brake command message is not issued to the at least one car in the train within the predetermined period of time.

15. The system of claim 14, wherein the brake pipe dump valve is in fluid communication with the brake pipe of the train.

16. The system of claim 14, wherein the helper locomotive is a pusher locomotive coupled to an end of the train without a physical connection to the brake pipe of the train.

17. The system of claim 14, wherein the predetermined period of time is in the range of from about 1 second to about 10 seconds.

18. The system of claim 14, wherein the predetermined period of time is in the range of from about 3 seconds to about 5 seconds.

19. The system of claim 14, wherein the electronically controlled pneumatic head-of-train brake command message is at least one of the following: a TBC=120% command, a lesser or reduced brake command, or any combination thereof.

20. The method of claim 1, further comprising:
   determining, by the end-of-train unit, that electronically controlled pneumatic braking has been initiated by the head-end unit if the electronically controlled pneumatic head-of-train brake command message has been issued to the at least one car in the train within the predetermined period of time.

21. The method of claim 20, wherein a first depletion of air from the brake pipe of the train in response to opening the brake pipe dump valve is greater than a second depletion of air from the brake pipe in response to the electronically controlled pneumatic braking.

* * * * *